UNITED STATES PATENT OFFICE.

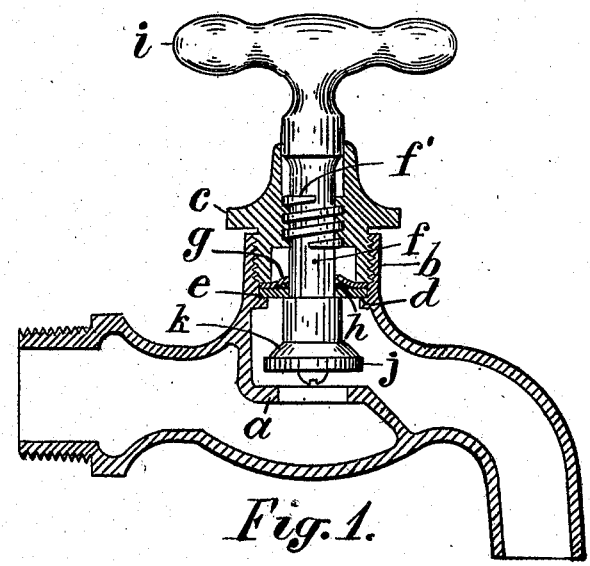
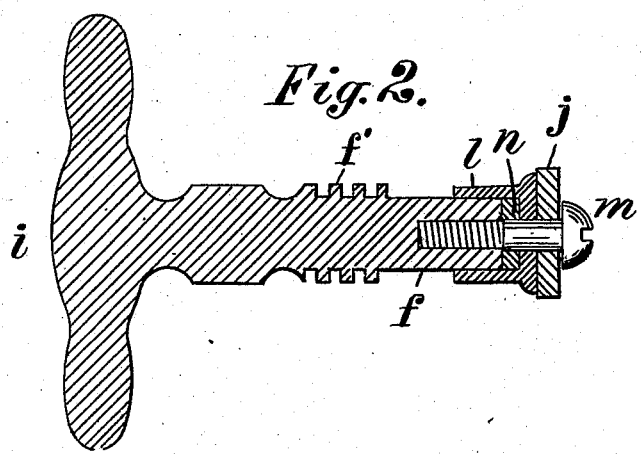

EDWARD G. HEDGES, OF NEWARK, NEW JERSEY.

COMPRESSION-COCK.

No. 905,181.  Specification of Letters Patent.  Patented Dec. 1, 1908.

Application filed February 18, 1907. Serial No. 357,893.

*To all whom it may concern:*

Be it known that I, EDWARD G. HEDGES, a citizen of the United States, whose residence is 269 Belleville avenue, Newark, county of Essex, and State of New Jersey, have invented certain new and useful Improvements in Compression-Cocks, fully described and represented in the following specification and the accompanying drawings, forming a part of the same.

This invention relates to compression bibs and cocks having a gland at one side of the valve-seat, with valve-stem threaded to such gland, and a packing-washer upon the inner end of the stem to close the seat.

The invention comprises a particular construction for the support of the packing-washer upon the end of the valve-stem, and embraces also means for preventing leakage around the valve-stem when the valve is opened.

The improvements are shown applied to a compression bib, Figure 1 being a longitudinal section, where hatched, at the center line of the bib; and Fig. 2 being an enlarged view of the valve-stem, partly in section at the center line where hatched.

$a$ designates the valve-seat, $b$ the socket over the same in which the gland $c$ is screwed.

$d$ designates a shoulder at the bottom of the socket, with a packing-ring $e$ seated thereon and fitted snugly at the center to the valve-stem $f$, which is screwed into the center nut of the gland by thread $f'$.

Between the inner end of the gland and the washer $e$, a disk $g$ is inserted and pressed hard upon the packing by the gland. The disk is dished upwardly at the middle to admit a fibrous collar $h$ which packs the valve-stem closely.

The valve-stem is shown formed at the outer end with an integral crossbar handle $i$, which is employed on account of its economy of manufacture. Such an integral handle prevents any enlargement of the inner end of the valve-stem to receive the packing-washer $j$, as the valve-stem must be inserted through the gland from the outer side of the same, and I therefore make the inner end of the valve-stem cylindrical, and smaller than the screw thread, so as to pass readily through the nut in the gland, and provide a tap-hole in such reduced end to secure a swivel-head $k$ thereon. The swivel-head is formed with a cup $l$ fitted to slide over the inner end of the valve-stem, and a screw $m$ is inserted through the bottom of the cup into the tap-hole in the spindle. In the bottom of the cup is inserted an annular packing $n$ and the screw passes through the packing-washer $j$, the swivel-head $k$, and this annular packing, and holds them all upon the point or inner end of the valve-stem.

To permit the turning of the swivel-head upon the valve-stem, the screw is shouldered or so fitted into the valve-stem that the head of the screw slightly clears the packing-washer, as shown in Fig. 2, and leakage around the body of the screw would therefore be possible when the packing-washer is pressed firmly upon the valve-seat. The annular packing $n$ operates to wholly prevent such leakage, by forming a tightly packed joint between the swivel-head and the end of the valve-stem, the packing-washer itself also making a tight joint with the outer side of the swivel-head.

When the packing-washer is crowded upon its seat by screwing the stem inwardly, the packing-washer makes a tight joint between the seat and the swivel-head, and the annular packing is also tightly compressed and makes a tight joint between the swivel-head and the end of the valve-stem, so that all leakage past the stem is prevented.

The cup $l$ is larger than the valve-stem, and when the valve-stem is screwed outwardly to open the valve as shown in Fig. 1, the upper end of the cup is pressed forcibly against the packing-ring $e$, and the packing-washer $j$ is pressed so tightly between the swivel-head and the head of the screw $m$ that no leakage can occur into the interior of the swivel-head. Any leakage past the packing ring is prevented and any escape of fluid past the valve-stem through the gland.

Having thus set forth the nature of the invention what is claimed herein is:

1. A compression cock having the threaded socket $b$ over the valve-seat, a shoulder $d$ at the bottom of the socket, the gland $c$ screwed in the socket, and compressing the packing-ring $e$ upon the said shoulder to make a tight-joint therewith, the valve-stem $f$ having crossbar handle $i$, and a thread $f'$ fitted to the center of the gland, and the end of the stem being smaller than such thread the swivel-head $k$ fitted movably on the stem and provided with the packing-washer $j$ to close the valve-seat, and the screw $m$ having head resting upon such packing-washer and extended through the same and through the face of the swivel-head into the end of the valve-stem, the construction preventing leakage when the valve is opened, by the jamming of the upper end of the swivel-head against the packing-ring $e$, and the simultaneous crowding of the packing-washer $j$ against the swivel-head by the head of the screw $m$.

2. A compression cock having a threaded socket above the valve-seat, a shoulder in the bottom of the socket, a gland screwed in such socket, an annular disk and packing-ring compressed upon such shoulder, the disk being dished and a fibrous collar inserted between the disk and the packing-ring, a valve-stem fitted to the disk and packing-ring and having a thread fitted into the gland and a handle upon its outer end, a swivel-head secured upon the inner end of the valve-stem and a packing-washer upon the swivel-head to close the valve-seat.

3. A compression cock having a threaded socket above the valve-seat, the socket being provided with a shoulder in its bottom, a gland screwed in such socket, an annular disk and packing-ring compressed upon said shoulder, the disk being dished, and a fibrous collar inserted between the disk and the packing-ring, a valve-stem fitted to the disk and packing-ring and having a thread fitted into the gland and an integral handle upon its outer end, a swivel-head larger than the valve-stem secured upon the inner end of the stem, a packing-washer to close the valve-seat, the swivel-head adapted, when the stem is retracted for opening the valve, to press upon the packing-ring under the gland and prevent leakage around the valve-stem.

In testimony whereof I have hereunto set my hand in the presence of two subscribing witnesses.

EDWARD G. HEDGES.

Witnesses:
THOMAS S. CRANE,
FRED C. WISSMAN.